United States Patent

Crouch et al.

[11] Patent Number: 5,958,117
[45] Date of Patent: Sep. 28, 1999

[54] STABILIZED, CORROSION-INHIBITED FIRE RETARDANT COMPOSITIONS AND METHODS

[75] Inventors: Robert L. Crouch, Phoenix, Ariz.; Christine Chang, Hsin-Chu, Taiwan

[73] Assignee: Fire-Trol Holdings, L.L.C., Phoenix, Ariz.

[21] Appl. No.: 09/051,316

[22] PCT Filed: Aug. 19, 1996

[86] PCT No.: PCT/US96/13949

§ 371 Date: Apr. 3, 1998

§ 102(e) Date: Apr. 3, 1998

[87] PCT Pub. No.: WO98/07472

PCT Pub. Date: Feb. 26, 1998

[51] Int. Cl.$^6$ .................................................. A62D 1/00
[52] U.S. Cl. ................................. 106/18.11; 106/18.24; 106/18.25; 106/18.26; 252/4; 252/6; 252/6.5; 252/7; 252/601; 252/602; 252/603; 252/607; 169/46; 169/47
[58] Field of Search .................. 106/18.11, 18.24, 106/18.25, 18.26; 252/4, 6, 6.5, 7, 601, 602, 603, 607; 169/46, 47

[56] References Cited

U.S. PATENT DOCUMENTS

| | | | |
|---|---|---|---|
| 4,151,099 | 4/1979 | Nassry et al. | 252/389 |
| 4,176,071 | 11/1979 | Crouch | 252/2 |
| 4,212,920 | 7/1980 | Seamans | 428/413 |
| 4,272,414 | 6/1981 | Vandersall | 252/602 |
| 4,392,994 | 7/1983 | Wagener | 252/602 |
| 4,447,336 | 5/1984 | Vandersall | 106/18.17 |
| 4,447,337 | 5/1984 | Adl et al. | 106/18.17 |
| 4,606,831 | 8/1986 | Kegeler et al. | 106/205.1 |
| 4,822,524 | 4/1989 | Strickland | 252/603 |
| 4,983,326 | 1/1991 | Vandersall | 252/603 |

*Primary Examiner*—Anthony Green
*Attorney, Agent, or Firm*—Drummond & Duckworth

[57] ABSTRACT

A gum-thickened fire retardant composition with improved stability and/or corrosion resistance contains a fire retardant salt, a gum thickener, an aqueous liquid carrier and at least one non-toxic water-soluble additive which is at least one carboxylic acid or salt thereof, having the structural formula

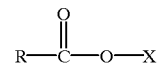

wherein R is a substituted or unsubstituted phenyl group, or a substituted or unsubstituted carbon chain containing conjugated unsaturation, and X is hydrogen or a metal.

The additive component is present in an amount effective to improve the stability of said composition and/or reduce the corrosivity of the composition to iron. Preferred compositions containing the combination of at least one compound in which R is a phenyl group, especially sodium benzoate, and at least one compound in which R is a carbon chain containing unconjugated unsaturation, especially sorbic acid.

11 Claims, No Drawings

STABILIZED, CORROSION-INHIBITED FIRE RETARDANT COMPOSITIONS AND METHODS

This invention relates to fire retardant compositions, especially adapted for preventing and fighting wildfires.

More particularly, the invention concerns such compositions which have improved stability.

In another respect, the invention concerns such compositions which have reduced corrosivity to ferrous metals.

In still another aspect, the invention relates to fire retardant compositions which are specially adapted to preventing and/or preventing the spread of wildfires and which are especially suited to aerial application.

According to yet another, more specific aspect, the invention concerns fire retardant compositions, specially adapted for aerial application, which are thickened with a carbohydrate thickening agent, such as galactomanan or derivitized galactomanan thickening agent, e.g., guar gum, hydroxypropyl guar, and the like, yet which have a combination of reduced corrosivity and increased stability.

A wide variety of fire retardant compositions which are used to prevent or combat the spread of wildfires (forest fires, range fires, etc.) have been proposed. Generally such compositions contain a fire retardant salt (e.g., ammonium phosphate—monobasic ammonium phosphate (MAP) and/or dibasic ammonium phosphate (DAP)—, ammonium polyphosphate, ammonium sulfate, and the like), an aqueous liquid vehicle, and various functional additives which improve specific characteristics of the composition. These functional additives may include, e.g., thickeners (to improve the aerial drop and fuel coverage characteristics), corrosion inhibitors (to reduce the corrosivity of the compositions to metal components of storage and application equipment), coloring agents (to improve the accuracy and coverage of successive aerial applications), stabilizing agents (to prevent separation of the various components of the composition during storage and transport), spoilage inhibitors (to prevent microbial decomposition of certain components), etc.

Illustrative examples of such prior art fire retardant compositions are disclosed in the U.S. Pat. Nos. 3,196,108 (Nelson) and 3,730,890 (Nelson), 3,960,735(Lacey), 4,176,071 (Crouch), 3,634,234 (Morgenthaler) 3,257,316 (Langguth), 4,822,524 (Strickland), 4,447,336 (Vandersall) and 4,839,065 (Vandersall).

As illustrated by the Crouch '316, Strickland '524, Morgenthaler '234 and Vandersall '336 patents, various natural and synthetic gums are advantageously used to thicken fire retardants compositions. Fire retardants containing such cellulosic thickeners are, however, notably susceptible to instability, causing the components to lose viscosity over extended storage periods. Unfortunately, the other functional additives, may cause or contribute to such instability problems. Thus, it has been observed that reduced corrosivity and improved stability are contradictory requirements for certain additives for fire retardants that are thickened with natural or synthetic galactomanan gum components.

Certain prior art functional additives which provide a measure of corrosion and/or stability control have been identified as having adverse impacts on human health and are listed as such by various governmental fire fighting agencies. In particular, the use of thiourea in fire retardants has been prohibited by the United States Forest Service.

It would be highly desirable to provide a non-toxic corrosion inhibitor for gum-thickened fire retardants which did not degrade the long-term stability of the compositions.

It would also be highly desirable to provide a non-toxic viscosity stabilizer for gum-thickened fire retardants which did not degrade the corrosion characteristics of the compositions.

In particular, it would be highly desirable to provide a non-toxic functional additive for gum thickened fire retardants which improves both the corrosivity and stability of gum-thickened fire retardants.

It has now been discovered that gum-thickened fire retardant compositions, containing a selected corrosion inhibitor additive, reduces the corrosivity of the composition to ferrous metals without sacrificing and, in some cases, even improving the stability of such compositions. In addition, gum-thickened fire retardant composition have been discovered, containing a selected stabilizing agent for gum-thickened fire retardants which improves the stability (viscosity loss) characteristics of the composition, without sacrificing and, in certain instances even improving, the ferrous metal-corrosion characteristics of the composition.

Briefly, the improved gum-thickened fire retardant compositions of the invention include a fire retardant salt, a gum thickener, an aqueous liquid carrier and an additive comprising at least one non-toxic, water-soluble carboxylic acid or salt thereof having the structural formula

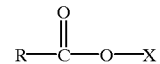

wherein R is a substituted or unsubstituted phenyl group, or a substituted or unsubstituted carbon chain containing conjugated unsaturation, and X is hydrogen or a metal.

In one preferred embodiment of the invention, the additive is benzoic acid.

In another preferred embodiment of the invention, the additive is sorbic acid.

In yet another preferred embodiment of the invention, the carboxylic acid or salt is a mixture of a non-toxic, water-soluble aromatic carboxylic acid or salt thereof and a non-toxic, water-soluble substituted or unsubstituted straight or branched-chain acid or salt thereof, especially a mixture of sodium benzoate and sorbic acid.

According to another preferred embodiment of the invention, the combination of such aromatic and straight/branched chain components appears to provide the optimum combination of corrosion inhibition and stability enhancement.

Representative examples of aromatic carboxylic acids, which are employed in the practice of the invention, include benzoic acid, salicylic acid and phenyl acetic acid.

Representative examples of straight or branched chain acids, which are employed in the practice of the invention, include sorbic acid, cinnamic acid (3-phenyl-2-propenoic acid), maleic acid, succinic acid derivatives having a side chain with conjugated unsaturation and 2-furoic acid.

Other suitable aromatic and straight or branched chain acids/salts can be identified without undue experimentation by those skilled in the art having regard for this disclosure.

In addition to the above-described novel fire retardant composition, the invention also contemplates methods for manufacturing novel fire retardant compositions, in which the additive compound is mixed with the other components of the fire retardant composition to provide the final improved composition.

In addition, the invention also contemplates methods of using such compositions to prevent and/or inhibit the spread of wildfires, comprising the step of aerially applying such improved fire retardant compositions to vegetation.

Sodium benzoate is known to inhibit corrosion of iron in the near neutral range, e.g., steel in aerated distilled water and I known to inhibit corrosion of steel in water at pH 7.5 containing 17 ppm NaCl (Corrosion and Corrosion Control, Uhlig & Revie (Wiley), pp. 266 et seq.). Sodium benzoate may have been disclosed in a publication as a corrosion inhibitor in fire retardants, thickened with an unknown type of thickening agent, there is no known prior art which teaches its use in stabilizing and/or inhibiting corrosivity of fire retardants containing gum thickeners, as disclosed herein.

The following examples illustrate the practice of the invention, but are not intended as limitations on the scope thereof. In each example the indicated components of the fire retardant formulation are mechanically mixed by any one of several mixing techniques well-known in the art to provide the indicated final compositions. Upon testing these compositions by standardized methods for compliance with U.S. Forest Service procurement specifications for viscosity loss and iron corrosion rate, the indicated results are observed. Corrosion rate is measured by NACE weight loss method using 4130 mild steel, partial immersion at 120° F., 90-day immersion.

EXAMPLE 1

Formulation: Ammonium Sulfate - Lightfast

| Ingredient | Weight % in Final Retardant |
|---|---|
| Ammonium sulfate | 14 |
| Tetrasodium hexacyanoferrate | 0.32 |
| Diammonium Phosphate | 0.95 |
| Hydroxypropyl guar | 0.82 |
| Xanthan gum | 0.008 |
| Iron Oxide ($Fe_2O_3$) | 0.13 |
| sorbic acid | (as below) |
| sodium benzoate | (as below) |
| water | balance |

TABLE 1

| % sorbic acid | % sodium benzoate | % original viscosity retained | Fe Corrosion Rate (mils/yr) |
|---|---|---|---|
| 0 | 0 | 15 | 23.5 |
| 0.10 | 0 | 64 | 6.4 |
| 0 | 0.10 | 59 | — |
| 0 | 0.30 | — | 10 |
| 0 | 0.50 | — | 5.5 |
| 0 | 0.70 | — | 3 |

EXAMPLE 2

Formulation: Ammonium Sulfate - Fading

| Ingredient | Weight % in Final Retardant |
|---|---|
| Ammonium Sulfate | 14 |
| Diammonium Phosphate | 0.95 |
| Tetrasodium hexacyanoferrate | 0.32 |
| Carbohydrate thickener | 0.83 |
| Fading Pigment | 0.13 |
| Iron oxide ($Fe_2O_3$) | 0.03 |
| Bactericide/Spoilage Inhibitor | 0.10 |
| defoamer/antifoamer | 0.06 |
| sorbic acid | as below |
| sodium benzoate | as below |
| water | balance |

TABLE 2

| % sorbic acid | % sodium benzoate | % initial viscosity retained | Fe Corrosion Rate mils/yr |
|---|---|---|---|
| (above formulation) | | | |
| 0 | 0 | 10 | 24.2 |
| 0 | 1.2 | 37 | 2.6 |
| 0.10 | 1.2 | 49 | 1.9 |
| 0.10 | 0 | 25 | 6.3 |
| (above formulation, omitting TSHCF) | | | |
| 0 | 0 | 5.6 | 29.3 |
| 0.3 | 0 | 9.7 | 12 |
| 0.6 | 0 | 11.1 | 6 |
| 0 | 0.75 | 9.4 | 2 |
| 0 | 1.5 | 12.2 | 4 |
| 0.3 | 0.75 | 17.5 | 2 |
| 0.6 | 0.75 | 18.9 | 1.7 |
| 0.3 | 1.5 | 20.4 | 2 |
| 0.6 | 1.5 | 23 | 1.5 |

EXAMPLE 3

Formulation: Ammonium Phosphate/Ammonium Sulfate - Lightfast

| Ingredient | Weight % in Final Retardant |
|---|---|
| Ammonium Sulfate | 8.4 |
| Diammonium Phosphate | 3.2 |
| Hydroxypropyl guar | 0.82 |
| Iron Oxide ($Fe_2O_3$) | 0.13 |
| bactericide/spoilage inhibitor | 0.10 |
| sorbic acid | as below |
| sodium benzoate | as below |
| water | balance |

TABLE 3

| % sorbic acid | % sodium benzoate | % initial viscosity retained | Corrosion rate mils/yr |
|---|---|---|---|
| 0 | 0 | 4 | 8.5 |
| 0 | 0.4 | 15 | 3.1 |
| 0 | 0.8 | 20 | 1.6 |
| 0 | 1.2 | 22 | 2.7 |
| 0.1 | 0 | 16 | 3.8 |
| 0.1 | 0.4 | 28 | 1.7 |
| 0.1 | 0.8 | 30 | 2.5 |
| 0.1 | 1.2 | 23 | 3.5 |

The formulations set forth below are mixed, yielding satisfactory iron corrosion and stability results.

EXAMPLE 4

This example illustrates the practice of the invention in connection with compositions similar to those disclosed in the Vandersall U.S. Pat. No. 4,983,326.

| Components | Weight % in | | |
|---|---|---|---|
| | Dry Concentrate | Liquid Concentrate | Final Mix |
| Mixture of ammonium salts with N–P ratio of at least 1.25[1] | 70.13–87.05 | 32.57–40.56 | 7.64–9.3 |
| Tricalcium Phosphate | 2.01 | 0.94 | 0.22 |
| Galactomannan Gum thickener | 7.24 | 3.39 | 0.78 |
| Polyalkylene derivatives of propylene glycol | 0.13 | 0.06 | 0.01 |
| Colorant[2] | 1.89 | 0.68 | 0.20 |
| Tetrasodium hexacyano ferrate (II) | 0–0.5 | 0–0.23 | 0–0.05 |
| Carboxylic acid or mixture[3] | 0.18–16.6 | 0.08–8.8 | 0.02–2.00 |
| Sodium Benzoate | 0.09–9.3 | 0.04–4.3 | 0.01–1.00 |
| Water | none | balance | balance |

[1] ammonium phosphate, ammonium sulfate or mixtures thereof
[2] lightfast (iron oxide, titanium dioxide) or fading (Day-Glo 122-9180) or mixtures thereof
[3] sorbic acid/salt, benzoic acid/salt, cinnamic acid/salt or combinations thereof

EXAMPLE 6

This example illustrates the practice of the invention with corrosion inhibitor-stabilizer components other than sodium benzoate and sorbic acid.

| Components | Wt. % Dry | Wt. % Final Mix |
|---|---|---|
| Ammonium Sulfate | 84.89–79.42 | 12.92–12.09 |
| Ammonium Phosphate[4] | 6.81–6.37 | 1.04–0.97 |
| Galactomannan Gum | 5.40 | 0.82 |
| Colorant[5] | 1.05 | 0.16 |
| Anti-microbial mixture[6] | 0.65 | 0.08 |
| Cinnamic Acid or salt | 0.66–6.57 | 0.01–1.00 |

[4] DAP, MAP or mixture thereof
[5] Lightfast (iron oxide or titanium dioxide) or fading (e.g., Day-Glo pigment 122-9180) or mixture of both
[6] 66% methyl paraben and 33% propyl paraben

EXAMPLE 7

This example illustrates a liquid concentrate formula suitable for dilution with water to a final retardant salt concentration that meets combustion retarding effectiveness in a given fire situation. The glactomannan gum is pre-dispersed in a non-aqueous carrier to make a liquid concentrate thickener solution and can be added at a variable rate directly to the final mixed product to achieve a desired viscosity.

| Components | Weight % in | |
|---|---|---|
| | Liquid Concentrate | Final Mix |
| Ammonium Polyphosphate | 91.5–79.00 | 5.0–25.0 |
| Suspending agent | 3.5 | 0.19–0.97 |
| TSHCF | 0–4.5 | 0.08–1.24 |
| Colorant[7] | 5.62–1.12 | 0.31 |
| Galactomannan Gum thickener | — | 0.2–0.80 |
| Carboxylic Acid or mixture[8] | 0.18–7.25 | 0.01–2.00 |
| water | none | balance |

[7] As in Example 6
[8] As in Example 6

Having described the invention in such terms as to enable one skilled in the art to make and use it and, having identified the presently known best mode of practicing it,
What is claimed is:

1. In a fire retardant composition, which includes
   a fire retardant salt,
   a gum thickener, and
   a liquid carrier,
the improvement comprising an additive which is,
   at least one non-toxic water-soluble carboxylic acid or salt thereof having the structural formula

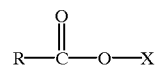

wherein R is a substituted or unsubstituted phenyl group, or a substituted or unsubstituted carbon chain containing conjugated unsaturation, and X is hydrogen or a metal,
said additive being present in said composition in an amount effective to reduce corrosivity of said composition.

2. The composition of claim 1 in which said additive is benzoic acid.

3. The composition of claim 1 in which said additive is sorbic acid.

4. The composition of claim 1 in which said additive is the combination of benzoic acid and sorbic acid.

5. The composition of claim 4 in which said benzoic acid and said sorbic acid are present in an amount effective to both reduce the corrosivity of said composition and to improve the stability of said composition.

6. In a method of manufacturing a fire retardant composition, said composition including components comprising a fire retardant salt, a gum thickener, a liquid carrier and a corrosion inhibitor, the improvement comprising including as said corrosion inhibitor at least one non-toxic water-soluble carboxylic acid or salt thereof having the structural formula

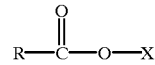

wherein R is a substituted or unsubstituted phenyl group, or a substituted or unsubstituted carbon chain containing conjugated unsaturation, and X is hydrogen or a metal, in an amount effective to reduce the corrosivity of said composition.

7. The method of claim 6 in which said carboxylic acid is benzoic acid.

8. The method of claim 6 in which said carboxylic acid is sorbic acid.

9. The method of claim 6 in which said carboxylic acid is benzoic acid.

10. The method of claim 6 in which said carboxylic acid is the combination of benzoic acid and sorbic acid and in which the amounts thereof are also effective to improve the stability of said composition.

11. In a method of retarding or extinguishing a wildfire, the step of aerially applying the composition of claim 1 to vegetation.

* * * * *